US010883471B2

(12) United States Patent
Leighton et al.

(10) Patent No.: US 10,883,471 B2
(45) Date of Patent: Jan. 5, 2021

(54) WAVE ENERGY CONVERSION/CONVERTORS

(71) Applicant: BOMBORA WAVE POWER PTY LTD, Bentley (AU)

(72) Inventors: Sam Leighton, Keysbrook (AU); Campbell Algie, Kensington (AU); Shawn Kay Ryan, Mundaring (AU)

(73) Assignee: Bombora Wave Power Pty Ltd, Bentley (AU)

( * ) Notice: Subject to any disclaimer, the term of this patent is extended or adjusted under 35 U.S.C. 154(b) by 0 days.

(21) Appl. No.: 16/107,610

(22) Filed: Aug. 21, 2018

(65) Prior Publication Data

US 2019/0101096 A1    Apr. 4, 2019

Related U.S. Application Data

(63) Continuation of application No. PCT/AU2017/050160, filed on Feb. 23, 2017.

(30) Foreign Application Priority Data

Feb. 23, 2016 (AU) ................. 2016900640

(51) Int. Cl.
*F03B 13/18* (2006.01)
*E02B 9/08* (2006.01)
(Continued)

(52) U.S. Cl.
CPC .............. *F03B 13/188* (2013.01); *E02B 9/08* (2013.01); *F03B 13/148* (2013.01); *F03B 13/24* (2013.01); *Y02E 10/30* (2013.01)

(58) Field of Classification Search
CPC ...... F03B 13/188; F03B 13/24; F03B 13/148; F03B 13/141; F03B 13/142; E02B 9/08; Y02E 10/32; Y02E 10/38; Y02E 10/30
See application file for complete search history.

(56) References Cited

U.S. PATENT DOCUMENTS 3,353,787 A    11/1967 Semo
4,630,440 A    12/1986 Meyerand
(Continued)

FOREIGN PATENT DOCUMENTS

AU    2013/101419    11/2013
FR    2567967 A1 *    1/1986    ............ F03B 13/188
(Continued)

*Primary Examiner* — Mark A Laurenzi
*Assistant Examiner* — Xiaoting Hu
(74) *Attorney, Agent, or Firm* — Levine Bagade Han LLP

(57) ABSTRACT

Wave energy convertor (WEC) 100 and related control methods. The WEC has at least one cell 102 of variable volume containing an energy transfer fluid and at least partially bounded by a movable flexible membrane 106, and the at least one cell has a substantially constant membrane pressure differential during at least part of a respective cell volume deflation or inflation stroke. Pressure differential between the exterior and interior surfaces of the membrane of the respective cell can be maintained as stable and constant as possible for a substantial part of the volume change during deflation and inflation of the membrane/cell. Membrane and/or cell inclination angle can range between 35° and 50°. Chord ratio of the flexible membrane of at least one cell can be between 1.01 and 1.3 during operation. A control surface 108 can modify the available membrane surface or limit of operation of the membrane for operation and/or modify an internal wall or surface of the cell.

30 Claims, 11 Drawing Sheets

(51) Int. Cl.
*F03B 13/14* (2006.01)
*F03B 13/24* (2006.01)

(56) References Cited

U.S. PATENT DOCUMENTS

2011/0162357 A1 * 7/2011 Bellamy .............. F03B 13/142
                                                       60/505
2011/0185721 A1   8/2011 Turner

FOREIGN PATENT DOCUMENTS

| | | | | |
|---|---|---|---|---|
| GB | 2061395 A |   | 5/1981 | |
| GB | 2129059 A | * | 5/1984 | ........... F03B 13/188 |
| GB | 2282188 A |   | 3/1995 | |
| GB | 2519282 A | * | 4/2015 | ........... F03B 13/188 |
| WO | WO-03033824 A1 | * | 4/2003 | .............. E02B 9/08 |
| WO | WO-2006048404 A1 | * | 5/2006 | ........... F03B 13/188 |
| WO | WO 2009/138740 |   | 11/2009 | |
| WO | WO-2011110820 A2 | * | 9/2011 | .............. F03B 13/14 |
| WO | WO-2012095669 A1 | * | 7/2012 | ........... F03B 13/188 |
| WO | WO 2014/026219 |   | 2/2014 | |
| WO | WO-2014026219 A1 | * | 2/2014 | |
| WO | WO-2014068312 A2 | * | 5/2014 | ........... F03B 13/188 |
| WO | WO 2017/143399 |   | 8/2017 | |

* cited by examiner

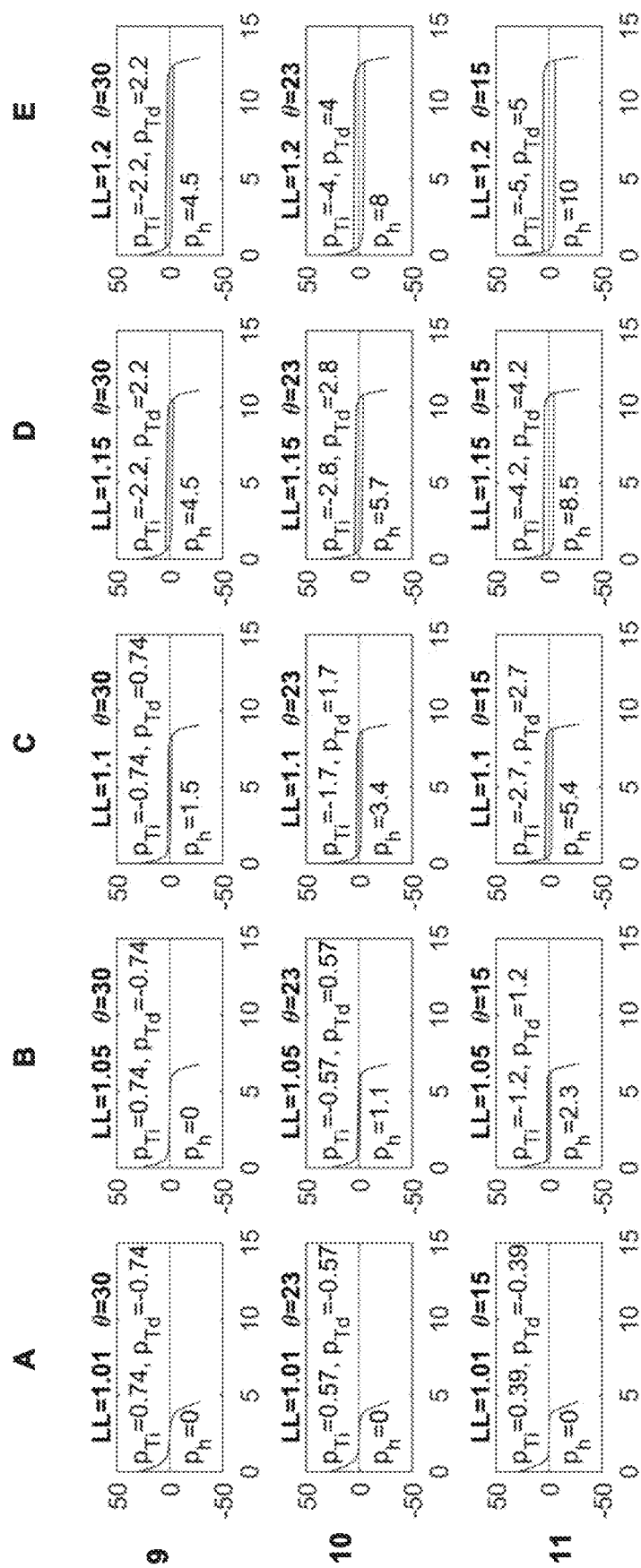

WAVE ENERGY CONVERSION/CONVERTORS

CROSS-REFERENCE TO RELATED APPLICATIONS

This application is a continuation of International Application No. PCT/AU2017/050160, filed Feb. 23, 2017, which claims priority to Australian Patent Application No. 2016900640, filed Feb. 23, 2016, both of which are incorporated by reference herein in their entireties.

FIELD OF THE INVENTION

The present invention relates to wave energy convertors and/or wave energy conversion utilising a wave energy transfer fluid.

One or more particular applications of the present invention relate(s) to flexible membrane type wave energy convertors/conversion.

BACKGROUND TO THE INVENTION

Waves are generated by wind passing over the surface of the sea. Surface waves are created by wind blowing on the surface of oceans and seas forcing the water to move in an orbital fashion.

Wave height is determined by wind speed, the duration of time the wind has been blowing, fetch (the distance over which the wind excites the waves) and by the depth and bathymetry (which can focus or disperse the energy of the waves).

In general, larger waves are more powerful than smaller waves, but wave power is also determined by wave speed, wavelength, and water density.

Oscillatory motion of the water particles in a wave is highest at the surface and diminishes with depth. However, for standing waves (clapotis) near a reflecting coast, wave energy is also present as pressure oscillations at great depth, producing microseisms. These pressure fluctuations at greater depth are considered to be too small to be a significant contributor from the point of view of wave power.

The waves propagate on the ocean surface, and the wave energy is transported horizontally with the group velocity. The mean transport rate of the wave energy through a vertical plane of unit width, parallel to a wave crest, is called the wave energy flux (or wave power). This is not to be confused with the actual power generated by a WEC sometimes called a wave power device (WPD).

Wave energy converters (WECs) are generally categorized by the method used to capture the energy of the waves, by location and by the power take-off system.

Locations are typically shoreline, nearshore (relatively shallow water) and offshore (relatively deep water).

Known types of WEC include point absorber buoys, surface attenuators, oscillating water columns, submerged pressure differential devices and overtopping devices.

The majority of deep water wave energy is contained in a column of water generally to a depth of ½ the wavelength of the waves. As the waves pass to the near shore the energy is concentrated into a shorter column of water.

A submerged WEC located on or raised from the seabed in the nearshore at relatively shallow water depths accesses and captures more of the energy per unit in the water column than submerged WECs located in deep water.

Many WECs use some intermediate means to capture energy from the wave and transfer it to a second fluid to drive a turbine and generator. Wave energy itself is quite complex, and the primary purpose of the intermediate mechanism is to be responsive to the wave and efficiently capture and transfer the energy to the intermediate fluid. It has been realised that there is a beneficial need for WECs to exhibit more effective transfer of the wave energy to the working fluid within the WEC than currently achieved in one or more prior art WEC systems/devices. Improved effectiveness of wave energy capture helps reduce the cost of energy production.

SUMMARY OF THE INVENTION

A WEC according to one or more forms of the present invention captures wave energy in an effective way through:
  pressure relationship/coupling across the membrane(s) to improve efficiency of pressure transfer from a wave to the energy transfer fluid in a cell; and/or
  pressure response/control of the energy transfer fluid within the WEC during corresponding change in volume of the energy transfer fluid by the WEC.

As waves pass over an embodiment of a WEC device or system of the present invention, at least one membrane deflects pumping air through a turbine to generate electricity. The device/system simultaneously addresses the cost of energy and survivability challenges.

An aspect of the present invention provides a wave energy convertor (WEC) with at least one cell having a variable volume containing an energy transfer fluid, wherein the variable volume is at least partly bounded by a movable flexible membrane, and wherein a chord ratio of the flexible membrane in use is between 1.01 and 1.3, the chord ratio being the ratio of the length of the flexible membrane relative to straight-line distance between opposed points of the flexible membrane, the effective length of the flexible membrane being greater than the straight-line distance between the opposed points, the opposed points being on a shared vertical plan.

Preferably, the vertical plane is orthogonal to the longest axis of the cell volume.

The vertical plane may be orthogonal to the membrane. For example, the vertical plane may pass through the membrane perpendicular to the front and rear axis of the membrane or perpendicular to a lengthwise axis of the WEC.

Preferably the chord ratio during operation is between 1.01 and 1.2, more preferably between 1.1 and 1.2, and even more preferably between 1.1 and 1.15

A further aspect of the present invention provides a wave energy convertor (WEC) including at least one cell having a variable volume for containing an energy transfer fluid, wherein the variable volume is at least partly bounded by a movable flexible membrane, and wherein a chord between opposed points of the flexible membrane is at an angle between 20° and 60° from horizontal, the opposed points being on the same vertical plane.

Preferably, one or more of the opposed points may be fixed.

Alternatively, one or more of the opposed points may be moved, such as by adjustment of an adjustment arrangement to control effective length and/or width of the flexible membrane an/or to control the chord ratio or chord angle of the membrane.

The adjustment arrangement may be dynamically controlled, such as by a control system having feedback based on wave energy, wave intensity, water depth, power demand from the WEC, environment and/or sea conditions, and membrane condition longevity.

A control surface may provide a travel limit for the membrane during a cell deflation or inflation stroke to control or vary performance of a given cell of the WEC.

The same or another control surface or structure acting on the membrane may provide a travel limit for the membrane during a cell inflation stroke, which can help to limit stresses on the membrane.

The shape and/or position of the control surface may be controlled, such as by an adjustment means, to vary the cell volume and/or the cell pressure and/or the membrane differential pressure and/or to vary the membrane geometry between upper and lower points to control the membrane chord ratio or chord angle.

For example, a moveable ramp, such as a translational movement and/or rotational (pivoted) movement, may be driven by an actuator to vary the inclination of the ramp. The ramp preferably acts on the control surface, thereby varying the slope, shape and or position of the control surface.

It will be appreciated that the control surface may form all of or part of a rear wall or boundary of the cell.

The control surface may be varied by a sliding ramp, which may be moved/driven on rollers or wheels, or rotated on a pivot, or driven by a screw or hydraulic actuator.

The control surface may be acted on by at least one flexible member, such as one or more flexible panels, which may preferably be driven by one or more member actuators.

The chord length/ration of the membrane, as well as the control surface shape and/or position, may be varied. An adjustment means may be connected to move the upper or lower portion of the membrane as well as the upper or lower portion of the control surface.

A fixed ramp may provide inclined support to the control surface. Movement of the adjustment means may be pneumatically, hydraulically or mechanically driven.

A lower region of the membrane is acted on by a roller mechanism 126 driven by an adjustment mechanism to vary the chord ratio.

A wave energy convertor (WEC) according to another form of the present invention may include at least one cell having a variable volume for containing an energy transfer fluid, wherein the variable volume is at least partly bounded by a movable flexible membrane, and a control surface limiting travel of the membrane in the cell deflation (pumping) stroke or cell inflation stroke.

A wave energy convertor (WEC) according to a further form of the present invention may include at least one cell having a variable volume for containing an energy transfer fluid, wherein the variable volume is at least partly bounded by a flexible membrane, the or each cell of the WEC having a membrane pressure-volume stiffness at or around zero for a substantial change in cell volume, wherein the membrane pressure-volume stiffness is the rate of change in the membrane pressure differential with respect to cell volume, and the membrane pressure differential is the difference between the external and internal pressure at a reference point.

Preferably the reference point is half way between a height differential between selected upper and lower points of the membrane.

Preferably the selected upper and/or lower point is/are fixed.

Preferably, the range in membrane pressure differential over at least part of the cell volume change is substantially less than the range in wave pressure over time at the membrane depth.

For example, if there is non-zero membrane stiffness, even with bi-stability, the change in membrane pressure during a proportion of the pumping (deflation) stroke is substantially less than the amplitude of wave pressure. This can help to ensure that the WEC cell pumps and does not stall or get 'locked'.

According to a further aspect of the present invention there is provided a wave energy convertor (WEC) including at least one cell having a variable volume for containing an energy transfer fluid, wherein the variable volume is at least partly bounded by a movable flexible membrane, the or each cell having constant or near constant membrane pressure differential during a respective cell volume decrease for at least part of a deflation stroke.

Another form of the present invention provides a wave energy convertor (WEC) wherein the points of inflection on a flexible membrane of at least one cell remain substantially at a constant vertical height, or rise slightly, during a stroke of the membrane, the points of inflection being the points on the membrane surface at which the pressure external and internal to the membrane are equal.

Pressure in the cell may be caused to increase or decrease at the end of a deflation or inflation stroke by control of porting, valving and/or one or more energy transfer fluid flow chokes/restrictors. For example, as the membrane approaches full stroke, the membrane may cover or uncover one or more ports, valves or chokes.

Membrane pressure-volume stiffness (the rate of change in the membrane pressure differential with respect to cell volume) has been identified as a important variable affecting wave energy capture efficiency or 'capture factor'.

Setting and/or controlling membrane pressure-volume stiffness of the cell by managing pressure/pressure change within the cell relative to the incident or predicted external pressure determines the response of the membrane to the incident wave.

Preferably, membrane differential pressure during at least part of the volumetric change under external (wave) pressure is controlled to be substantially constant. For example, in a membrane pressure differential vs volume graph, a line representing the membrane pressure differential is substantially level for at least a proportion of the cell volume change, preferably during a mid stroke portion of deflation or inflation of the membrane.

Preferably, a decrease in cell pressure is avoided during the cell volume change, which may be achieved by maintaining and/or modifying the cell pressure during the stroke.

Preferably, a change between increasing and decreasing membrane pressure differential, or between positive and negative membrane pressure-volume stiffness, is avoided during a single cell stroke, which may be achieved by maintaining and/or modifying the membrane pressure-volume stiffness during the stroke.

Consider the points of inflection on the membrane (e.g. the inflection of surface curvature on/across the membrane as the external pressure moves up/down the membrane as the wave passes over the WEC). As the membrane travels through a pumping stroke (cell volume decreasing), these points of inflection travel horizontally or upwards (see, for example, FIG. 3). This contrasts markedly with, for example, the embodiment shown in FIG. 3 of US 2011/0185721 attributed to Turner, which only identifies a fixed point (say, point 80) on a membrane 70 at various points during a stroke (see differing line symbols representing a 2D side view of travel of the membrane).

At least one control surface may be provided within or as a back wall to the respective cell. During a deflation stroke, at least a portion of the membrane may contact the at least one control surface. Preferably, the at least one control surface provides/acts as a brake/damper and/or stop for membrane travel.

The at least one control surface may include a solid continuous surface or may include an open framework, mesh or grid.

The at least one control surface may be internal or external to the cell, or may include a combination of both internal and external control surfaces with respect to cell.

The at least one control surface may act to support a lower portion of the membrane. The ramp controls volume bi-stability. Volume bi-stability exists when there are two or more stable cell volumes with same membrane pressure differential.

The lower support portion of the control surface may provide a ramp as a straight or curved control surface, or combination thereof, for a lower portion of the membrane.

Preferably the control surface may be inclined at an angle from horizontal, from or adjacent the lower fixed end of the membrane.

The control surface may include a curved portion, such as a concave portion with respect to the membrane that moves toward/away from the control surface. Preferably the curved e.g. concave portion is provided toward an upper portion of the respective cell (e.g. toward the upper fixed end of the membrane).

The control surface may be a structural portion of the respective cell(s) or may be provided as an insert or adaptable surface to modify WEC cell function. For example, the control surface may be one of a selection of alternative shape options to be mounted to the WEC to provide cell responsiveness/performance characteristics for WEC location or incident wave characteristics.

The preferred angle of the control surface from horizontal may be determined as a function of the chord angle with respect to horizontal (chord positive/negative inclination) and/or chord ratio.

The membrane pressure-volume stiffness of the cell/membrane has been found to tend to exhibit volume bi-stability when the angle of inclination of the chord is at or below 30° and/or the chord ratio during operation is at or above 1.1. The smaller the inclination angle and/or the greater the chord ratio, the greater the range of pressures over which bi-stability exists. Within this range, volume bi-stability causes hysteresis, when an inflating cell membrane rests at a different stable volume to a deflating cell membrane at the same membrane pressure differential. Hysteresis can be seen in the examples in FIGS. 1 and 2 at around a chord ratio of 1.15 and an inclination angle of 37.5° and at a chord ratio of 1.1 and an inclination angle of 30°, and values beyond these (hysteresis shown as blue deflation and red inflation lines).

Preferably the inclination angle is less than 30° to reduce or avoid heave and surge effects on the WEC. However, as shown in FIGS. 1 and 2, angles below 30° tend to exhibit relatively strong volume bi-stability with hysteresis. Providing the control surface helps to mitigate or remove such effects.

FIG. 3 shows an example of introducing the control surface to eliminate bi-stability, compared to an example without the control surface.

The control surface may be provided as a ramp that controls/limits maximum deflection of the membrane for at least part of the full stroke of the membrane. This control/limit is preferably at/for a lower portion of the membrane. However, the control surface may extend up towards or to porting/valving of the cell.

At least one turbine may be driven by pressure flow from the cell(s) of the WEC. Pressure within the cell(s) may be controlled by controlling turbine speed.

Controlling the turbine speed and/or varying turbine blade angle may be used to vary back pressure to the cell(s) and thereby control pressure within the cell and the rate of change in cell volume with respect to the incident wave(s).

It will be appreciated that the membrane pressure-volume stiffness is not affected by such back pressure. However, the flow rate from the cell is affected by such back pressure.

Alternatively, or in addition, valving/porting controlling pressure flow from and/or to the cell(s) may be set and/or controlled and/or one or more choke(s) may be provided, to control the rate of change in cell volume.

The shape of the backing wall maybe monotonically rising, preferably at least from a lower or bottom region of the control surface (e.g. a backing wall).

Preferably, the flexible membrane may be supported by a backing surface during displacement and/or at full displacement of the flexible membrane.

For example, in use, preferably the membrane may touch the backing surface at partial displacement of the membrane, and more preferably at full displacement of the membrane.

Preferably, the desired membrane pressure-volume stiffness is provided in a flexible membrane or cell type WEC.

Preferably, the chord angle of the membrane may be between +/−20° and +/−60° from horizontal.

Angle of inclination of a body containing at least a portion of the energy transfer fluid may be within the range of +/−20° to +/−60° from horizontal (i.e. a vertical membrane/cell being at 90° to horizontal).

The straight-line 'chord' defined between the upper and lower fixed points of the membrane may be angled (inclined/declined) within the range +/−20° to +/−60° from horizontal (i.e. a vertical chord being at +/−90° to horizontal).

With regard to a flexible membrane—variable cell volume type WEC, the angle of inclination of the membrane/cell may be positive or negative within the range of +/−20° to +/−60° from horizontal (i.e. a vertical membrane/cell being at +/−90° to horizontal).

For a membrane type WEC, the angle of inclination is preferably determined to be the inclination of a line, real or imaginary, extending from one fixed end of the membrane to an opposite fixed end of the same membrane i.e. from a lower end to an upper end, the line coinciding with a vertical plane.

A preferred inclination angle for a body containing at least some of the energy transfer fluid may be in a range between +/−35° and +/−50°, more preferably around +/−37.5° to +/−45°, from horizontal.

A further aspect of the present invention provides a wave energy convertor (WEC) control method, the WEC having a variable volume containing a fluid for effecting energy transfer from the wave, the method including;
a) controlling pressure and/or displacement of the fluid such that a substantial part of the displacement of the fluid occurs over a substantially constant pressure.

Preferably, at least some of the displacement of the fluid occurs after the peak of the wave pressure has occurred.

Preferably, the substantially constant pressure is determined by measuring or predicting the pressure of the wave to transfer to the fluid.

Preferably, the pressure at which the substantial part of the displacement occurs, is at a pressure which is towards or at the highest pressure incident on the WEC.

Preferably a WEC according to at least one embodiment of the present invention is submerged and located on the seabed in the nearshore environment (e.g. 5 to 15 m water depth). These features enable the device to be in a relatively protected environment yet still access a significant and effective level of wave energy.

Preferably the WEC may have a negatively buoyant body that rests directly against the sea floor or supported spaced from the seafloor to provide a means of storm protection for the WEC.

A mooring or foundation system can be incorporated to provide a greater level of restraint against localised wave loads if required and to accommodate a range of seafloor bathymetry and geotechnical requirements.

Risk of collision from vessels can be avoided by the WEC being mounted on the seafloor providing good under keel clearance. Preferably the WEC can be raised or lowered within the water as required by the prevailing depth of water and/or sea conditions and/or vessel proximity.

Many other locations and WEC/WEC cell/membrane configurations have been devised and covered in international (PCT) patent application PCT/AU2013/000869 published as WO 2014/026219, the contents of which are incorporated herein in their entirety.

The majority of deep water ocean wave energy is contained in a column of water generally to a depth of ½ the wavelength of the prevailing waves (e.g. around 40 m deep). The water particles tend to move in an orbital fashion with the energy generally 'rolling' through the ocean. As the waves pass to the near shore, some energy is dissipated, but the remainder is concentrated into a shorter column of water with the particles moving in a more elliptical manner.

Advantageously, one or more forms of the present invention provides a relatively low cost and relatively light weight, flexible membrane system to efficiently couple with the wave.

The WEC has one or more individual cells containing a 'working fluid' (such as a gas, which may be air, modified air e.g. containing a higher proportion of nitrogen or other element(s) than air alone, or other gas(es)).

For multiple cell WECs, the individual cells may be separated from each other by a diaphragm, wall or membrane.

The membrane acted on by the wave pressure transfers the wave energy to pressurised fluid (e.g. air) (pneumatic) within the device.

Air also exhibits lightweight characteristics, which reduces inertia effects compared with liquids.

Many other devices use large, heavy, rigid bodies to interact with the wave, capturing the energy and transferring it to a liquid system. Both the heavy body and liquid system exhibit high inertia or lag and tend to be less responsive to the complex wave movements.

The WEC is preferably a submerged membrane device overcoming the wave capture limitations of other membrane wave energy devices with its novel inclined or 'ramped' design. An optional Vee shaped array of cells can enhance WEC performance.

A WEC according to one or more forms of the present invention may include multiple cells, each cell having a volume of energy transfer fluid varied by sufficient external pressure on a membrane, at least a first cell of the WEC facing toward an incident wave and at least a second cell facing away from the incident wave.

The WEC can be responsive to incident waves (capture wave energy) with cells both facing and none facing to the incident wave(s). The WEC may include multiple said cells facing the incident wave and/or multiple said cells facing away from the incident wave.

Preferably the wave facing and wave non-facing cells are provided back to back across the WEC.

Alternatively, the wave facing and non-wave facing cells may be offset with respect to one another (i.e. not directly aligned back to back) such that the cell pressure response along the WEC alternates between the wave facing and wave non-facing cells. This arrangement of cells offset with respect to one another on opposite sides/faces of the WEC can help to smooth out pressure response along the WEC.

The cell or cells facing away from the incident wave(s) can have a chord angle that declines with respect to the oncoming incident wave i.e. a negative inclination angle. For example, the cell or cells facing the wave can have an inclined chord angle and the reverse cells can have a negative (declination) chord angle with respect to the incident wave.

The WEC may be provided as an array of one or more pairs of cells configured back to back, which may be arranged with each pair directly back to back or offset with respect to each other.

Alternatively, each cell may be provided as a modular, standalone cell operatively linked to one or more other cells to form the WEC.

A WEC embodying the present invention may operate by pressurising into a common manifold system to a drive turbine and generator. As the wave passes over the device, it impresses upon the membrane to create a sequence of positive system pressures in areas under the wave peak and negative system pressures in areas below the wave trough. These positive and negative pressures provide a pressure differential across the turbine and ultimately generate flow around the close loop circuit following a 'source and sink' principle. Check valves are introduced between the diaphragm cells to control the flow in one direction.

The turbine or each turbine and/or valving from/to the cells may be controlled to vary timing of discharge and intake phases to extract wave energy around the peak of a wave.

Utilising a light weight, flexible membrane and low inertia medium, such as air, allows the WEC system to respond substantially in phase with complex, real world wave motions.

The prime purpose of the fluid medium, whether it be air, or other gas(es), water or hydraulic fluid is to efficiently collate and transmit energy from the mechanism in contact with the wave (the membrane(s)) to a turbine to convert the energy to rotational power.

Frictional losses in the system are substantial for liquid media, and the inertial phase lag (created from accelerating and decelerating the liquid) makes a WEC system slow and not sufficiently responsive to the wave to effectively capture the passing wave energy flux over a broad range of operating conditions.

Wave energy is a variable, pulsating form of energy. To 'regulate' or harness the wave energy a membrane and multi-cell arrangement is preferred.

Selection of the number of cells and/or the orientation of the cells relative to the incident wave front and/or the disposition of the cells relative to one another, can be utilised to create required responsiveness and performance characteristics of the WEC for given prevailing wave and environment conditions. This can help with obtaining relatively steady flow (reduces pulsing) of the energy transfer fluid during operation of each cell across the WEC, which leads to more efficient capture at the turbine(s).

Preferably the WEC includes a minimum of 3 cells or 4 cells, which can limit the proportion of 'dead space' between cells. With arrays of larger numbers of cells (say, 5 or above—see, for example, FIG. 4), the non-responsive 'dead space' between cell membranes can play a significant factor in not allowing a sufficiently significant increase in WEC performance for the added complexity and materials needed for such a larger WEC.

It will be appreciated that, because the flexible membrane/cell type WEC may preferably be a fixed volume 'closed' system, the flow within the WEC in such a 'closed' system is driven by the difference in pressure between the multiple cells. For a particular wave height, this difference in pressure is affected by the distribution of the multiple cells below the wave peaks and/or troughs. For example, the difference in pressure between cells distributed under a wave peak only will be less than the difference in pressure between cells distributed under a wave peak and trough.

In addition to the selection to the number of cells, through use of check valves, common pressure and return manifolds, and the source and sink principles, a single directional flow of medium (such as airflow) can be created. This allows a relatively even flow to the turbine, and the turbine to be more optimised and less expensive than in bi-directional flow systems.

Much of the world's useful ocean wave resource is contained in relatively small coastal (nearshore) waves. Due to the low friction and low inertia features of one or more forms of the present invention, energy at low sea states can be effectively absorbed by the WEC.

Because of the use of a common source and sink, it is preferred that cells across the length of the WEC experience a similar dynamic pressure/wave pressure range. A height difference between individual cells has a direct influence on the pressure able to be discharged (e.g. into the output duct). Therefore, preferably the height range across the cells is maintained significantly less than the height range of the incident waves.

BRIEF DESCRIPTION OF THE DRAWINGS

FIG. 2A shows a close up of inflation 'I' and deflation 'D' curves shown in the lower right hand example from FIG. 2, as indicated.

Figure 2:
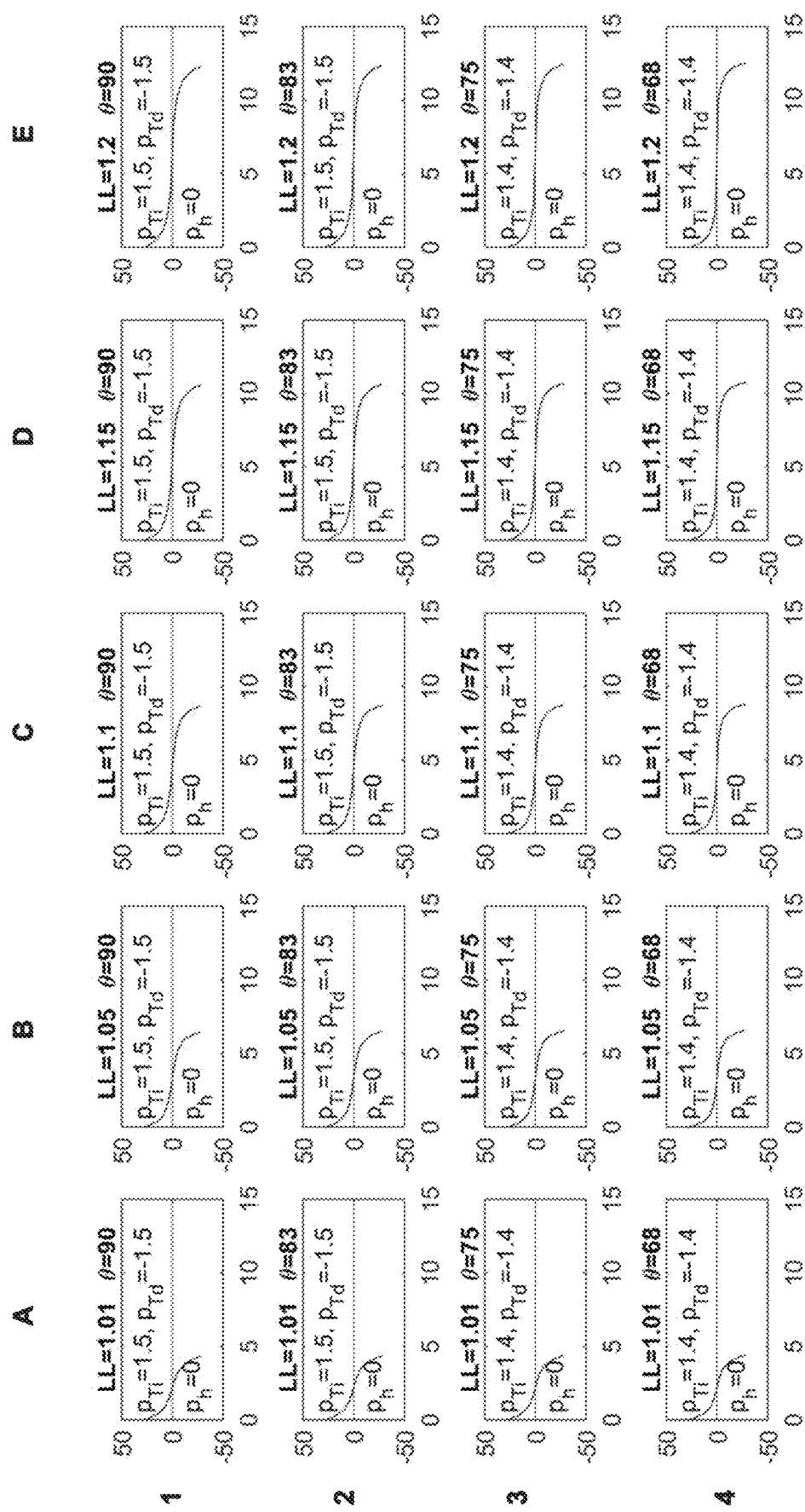
FIG. 2 shows plots of the membrane pressure differential for calculated static equilibrium membrane volumes during inflation (red) and deflation (blue), for a range of membrane length ratios (LL) and angles (θ) corresponding to those simulations shown in FIG. 1. On plots in which the inflation and deflation lines overlay, these lines indicate the membrane pressure-volume stiffness.
Figure 2:
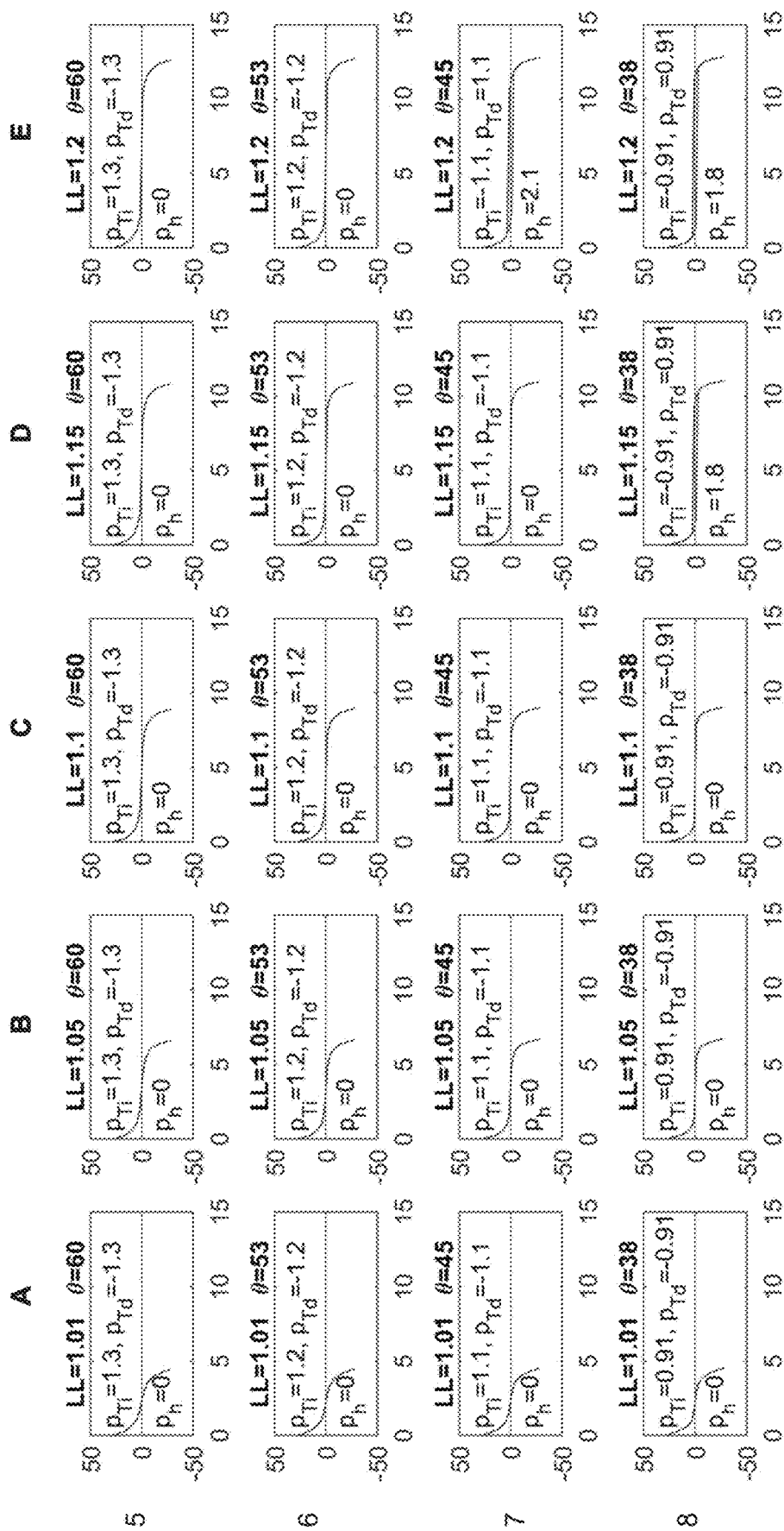

Hysteresis occurs for some simulations, when volume bi-stability exists, and an inflating cell membrane rests at a different stable volume to a deflating cell membrane at the same membrane pressure differential. In these cases, the plots shown in FIG. 2 show the membrane differential pressure as a function of cell volume in the inflation and deflation direction of volume change, instead of the actual membrane pressure-volume stiffness, which causes the membrane to have no stable volume within the range of volumes over which bi-stability exists. Abscissa: Volume in litres per unit device length. Ordinate: Membrane pressure differential in kPa.

Figure 3:
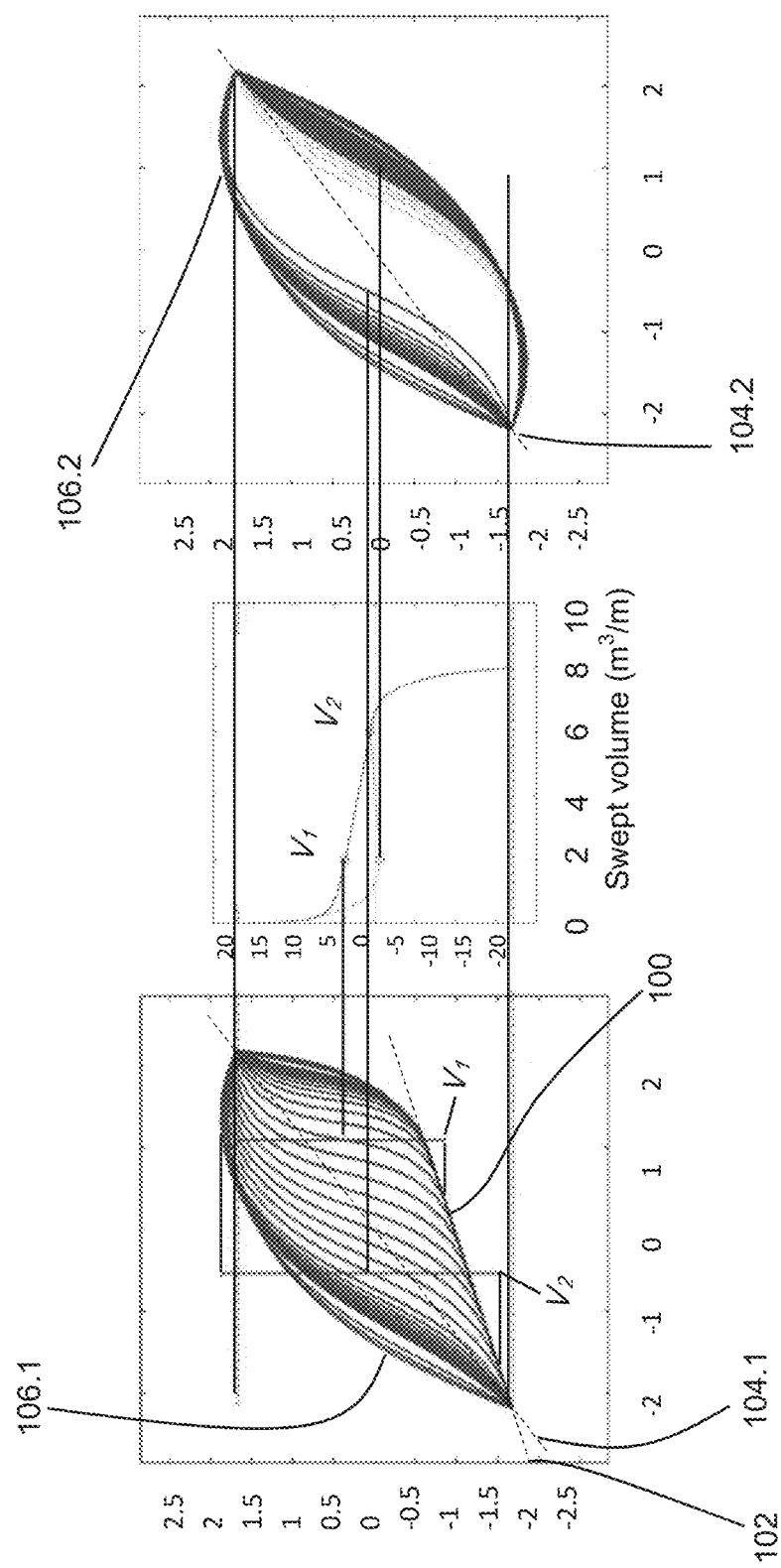

FIG. 3 shows a comparison of membrane pressure-volume stiffness (pV) functions, both with and without a control surface, in relation to one or more embodiments of the present invention.

Figure 4:
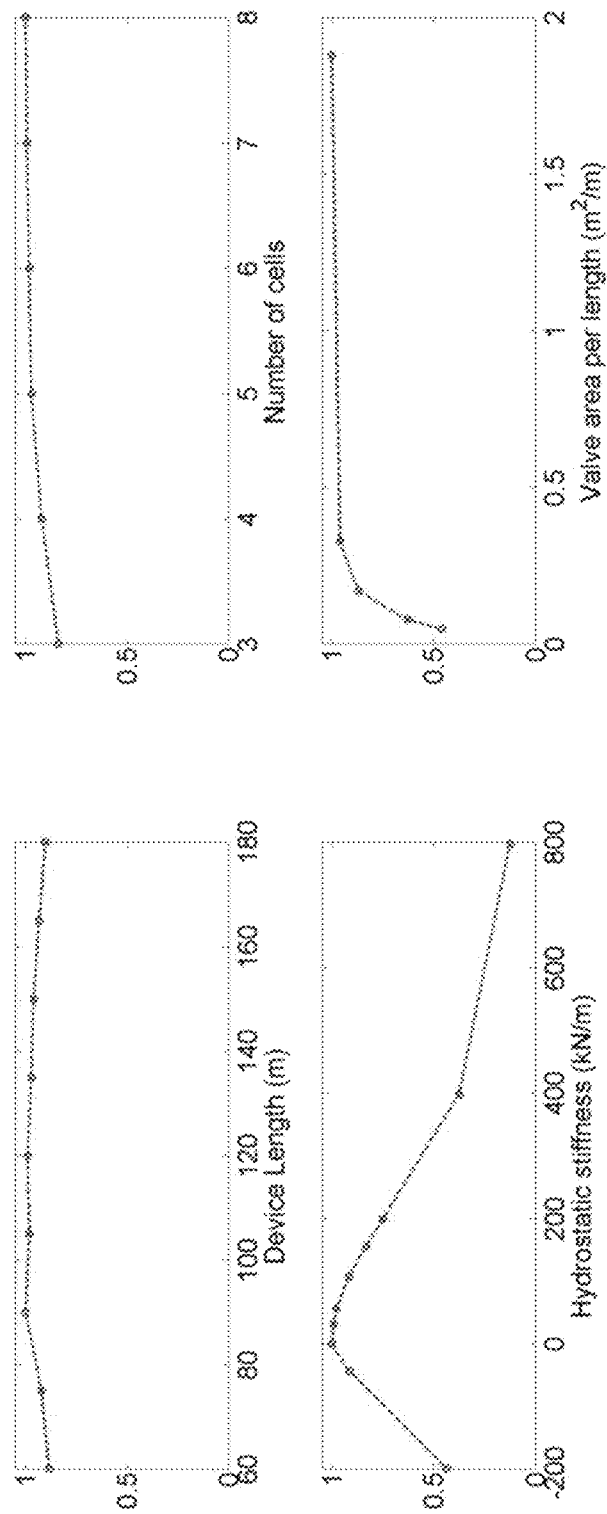

FIG. 4 shows mean annual capture factor (normalised) as a function of four device parameters considered.

Figure 5A:
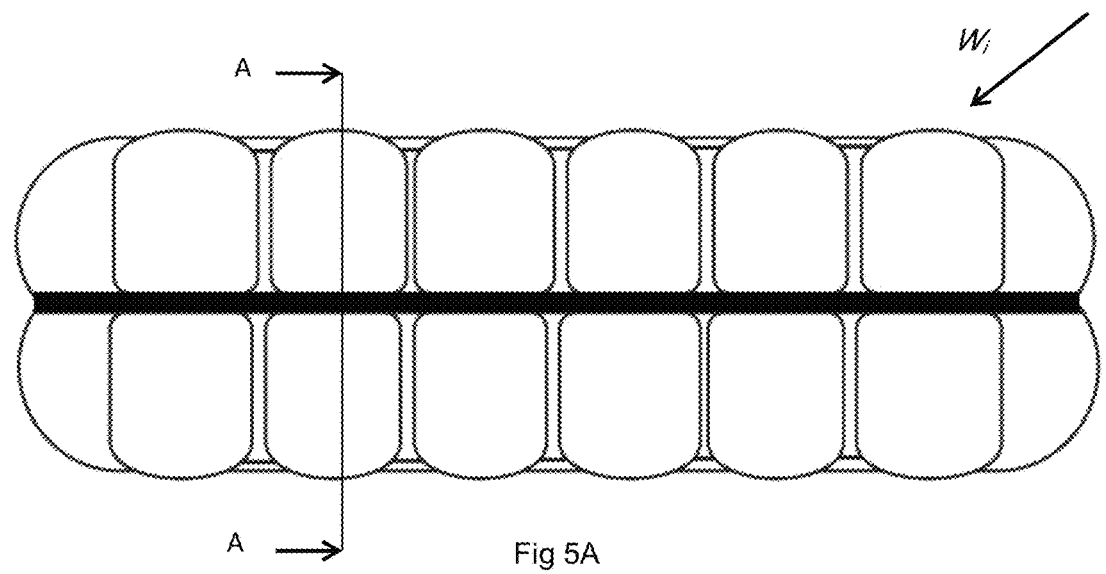
Figure 5B:
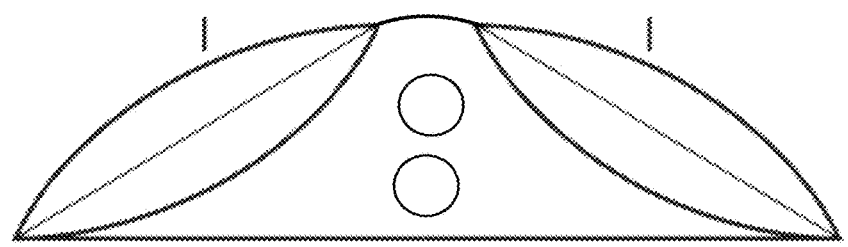
Figure 5C:
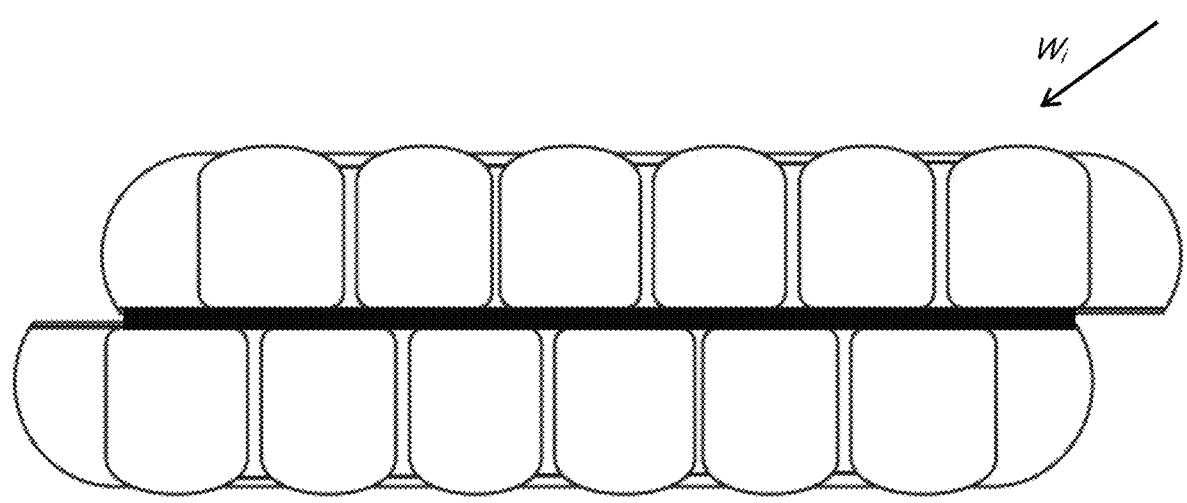

FIGS. 5A to 5C show views of embodiments of back to back WEC cells in aligned back to back (FIG. 5A) and staggered/offset (FIG. 5C) arrangements. FIG. 5B shows a cross section through line A-A of the configuration in FIG. 5A.

Figure 6A:
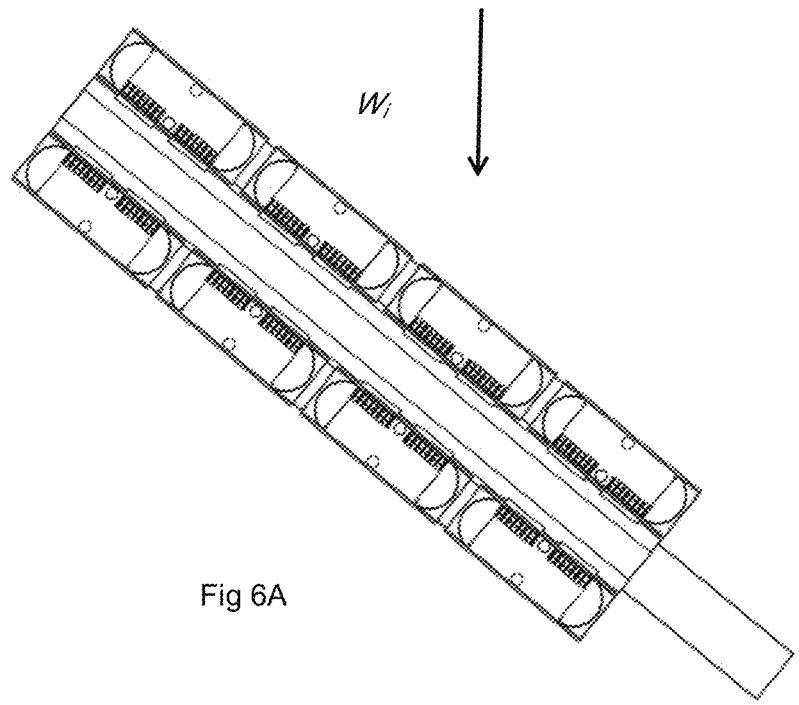
Figure 6B:
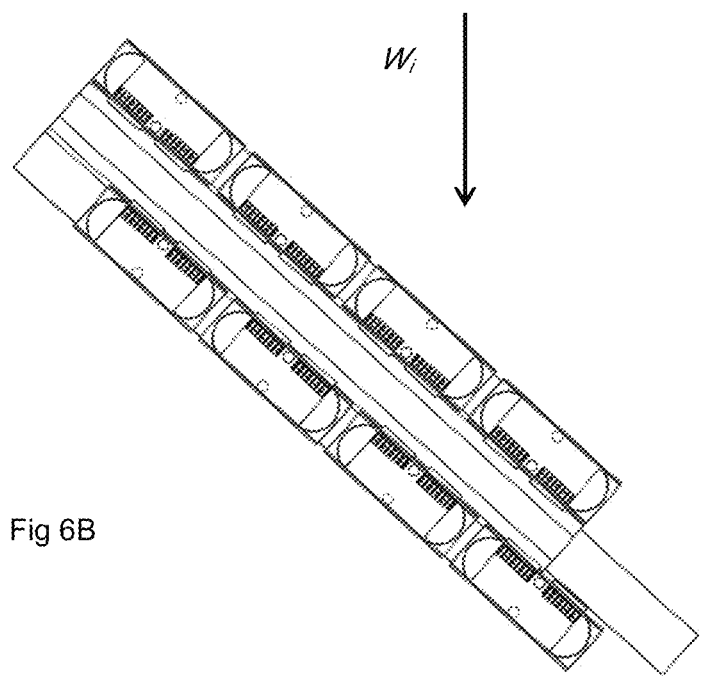

FIG. 6A shows an alternative arrangement of back to back aligned WEC cells, whilst FIG. 6B shows an alternative arrangement of back to back offset alignment cells.

FIGS. 7 to 12 shows alternative arrangements for varying the shape and/or position of a control surface of the WEC and/or varying the chord ratio of the membrane according to various embodiments of the present invention.

DESCRIPTION OF PREFERRED EMBODIMENT

Figure 1:
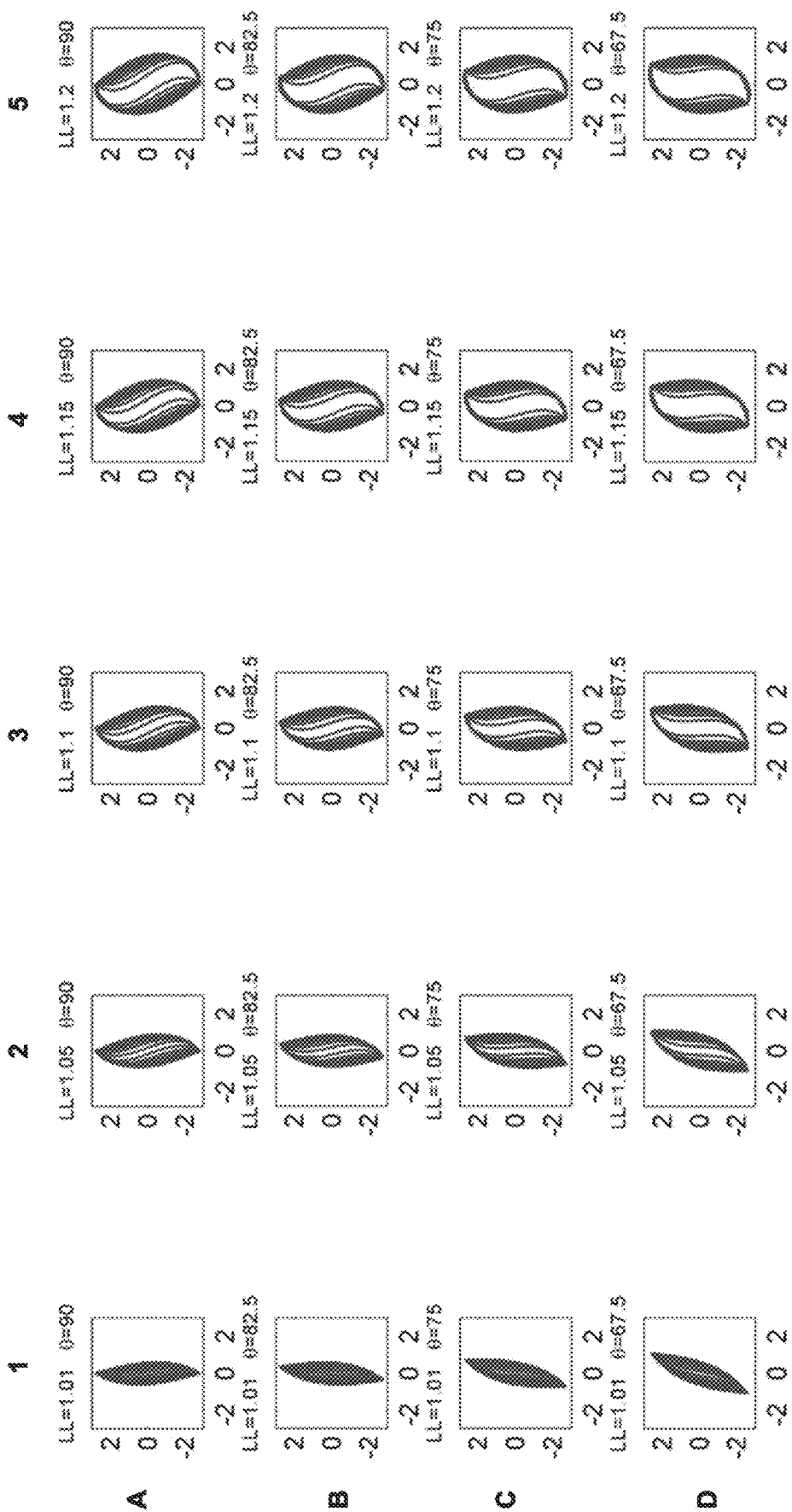
FIG. 1 shows simulated WEC membrane static profile during inflation (red) and deflation (blue), for a range of membrane length ratios (LL) and angle (theta). Dimensions in metres.
Figure 1:
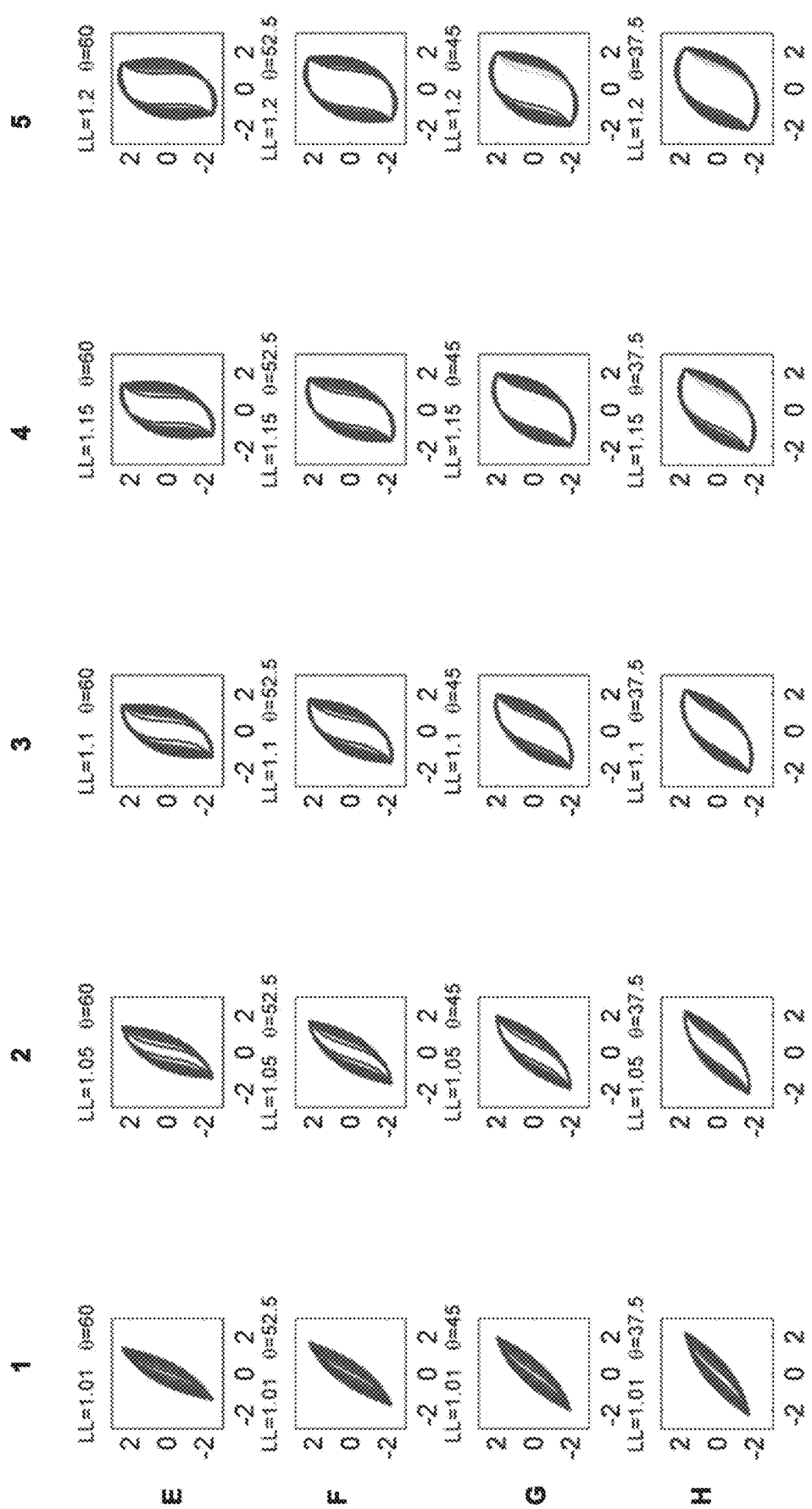
Figure 1:
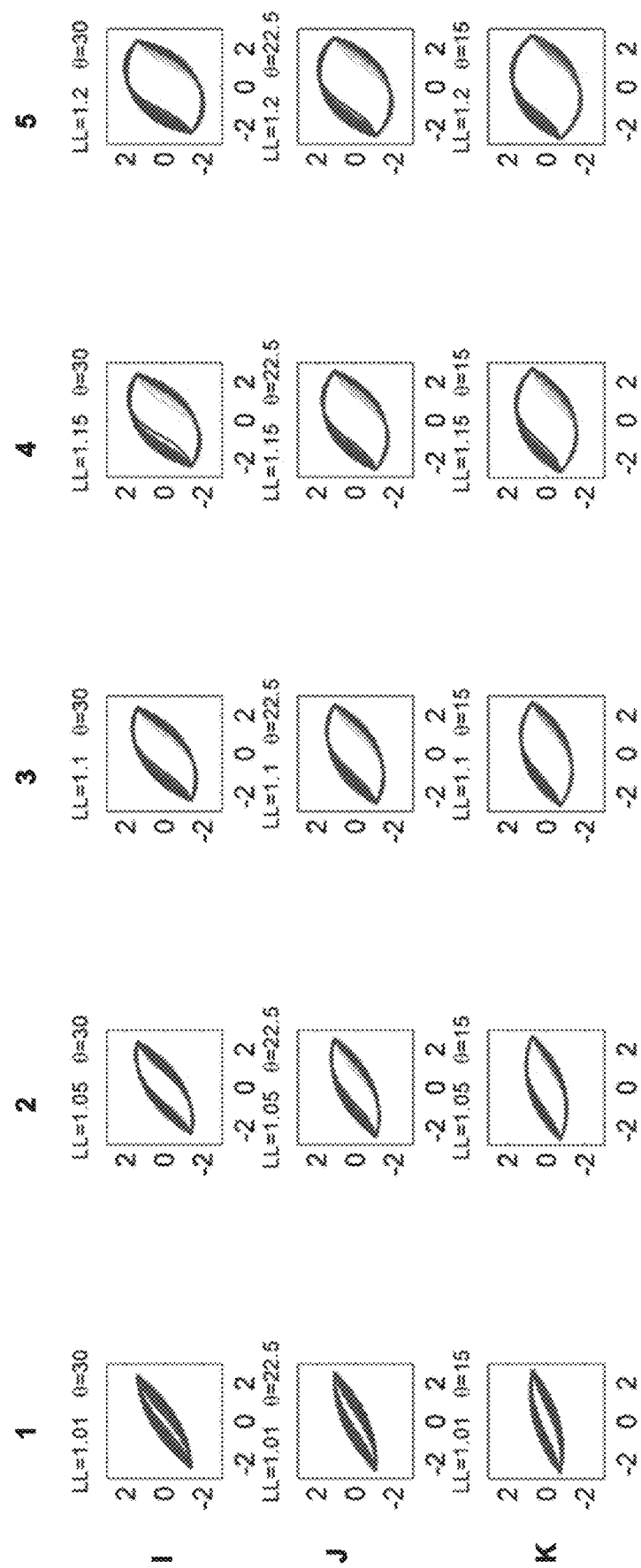

In FIG. 1, a simulated WEC membrane static profile is represented during inflation (red) and deflation (blue), for a range of membrane length to chord length ratios (LL) (chord ratio) and angle (theta) (angle of inclination/declination of one fixed end of the membrane compared to the opposite fixed end of that membrane during operation.

As exemplified by the membrane pressure-volume stiffness plots in FIG. 2, preferred stiffness plots fall in a membrane/cell angle range of 30° to 60° from horizontal (i.e. a vertical membrane/cell being at 90° to horizontal).

Preferred membrane/cell inclination angle range is between 35° and 50°, more preferably around 37.5° to 45° from horizontal.

Preferred membrane pressure-volume stiffness plots maintain the membrane pressure differential as stable and constant as possible for a substantial part of the volume change during deflation and inflation of the membrane.

Preferably, the deflation and inflation plots of membrane pressure differential as a function of cell volume substantially match each other; though one is the opposite of the other of course i.e. their membrane pressure differential plots preferably overlay each other.

After an initial change in membrane pressure differential at the beginning of inflation or deflation, preferably the differential is maintained as near as possible to a constant preferred differential. This allows efficient energy extraction from the wave, maintains consistent energy extraction and reduces losses.

Preferably, the constant pressure differential is the same for all cells.

Bi-stability occurs at the shallower (smaller) angles of inclination when the membrane chord length is at the longer end of the range. Such bi-stability prevents the system from responding efficiently to waves that produce a range in external cell pressure that is less than the range of pressure differential in which bi-stability exists. It has been beneficially realised that angle of inclination and membrane chord length can be optimised to reduce losses due to this effect and efficiently extract energy from all waves.

FIG. 3 helps to illustrate the stabilising effect of a control surface 101 (such as a floor) on a bi-stable membrane 107 of a WEC, according to at least one embodiment of the present invention.

As shown on the left hand side with respect to the embodiment shown in FIG. 3, the control surface 101 is set at an angle 103 with respect to horizontal, which allows the chord 105.1 of the membrane 107.1 to angle closer towards horizontal and avoid volume bi-stability effects than would be the case for a chord 105.2 of a membrane 107.2 without the control surface (as shown on the right hand side in FIG. 3) i.e. the cell membrane can be less upright, be more responsive to the incident wave pressure and less prone to heave and surge effects with the control surface than without it.

As represented in the central graph in FIG. 3, as the volume of the swept cell decreases and membrane pressure differential increases, the solid portion of the curve between indicated reference points $V_1$ and $V_2$ shows a smooth, consistent increase in membrane pressure differential for a decrease in volume. The dotted plot below and between reference points $V_1$ and $V_2$ shows how the membrane pressure differential and volume characteristics would have behaved if the floor had not been present.

As can be seen, membrane pressure differential would have effectively decreased during part of the volume decrease, thereby making the membrane un-stable between $V_1$ and $V_2$ and resulting in two points of stability outside of this volume range. At these bi-stable points, the rate of change in volume with respect to pressure is much lower than at the corresponding single point of stability that exists if the floor is present. Consequently, a wave that provides a range in external membrane pressure that is less than the range over which bi-stability exists causes less volume change (pumping) in the cell than would result if the floor was present.

An increasing proportion of the lower part of the flexible membrane contacts the floor of the cell as the membrane flexes during deflation as the wave pressure passes over the membrane. Stabilisation occurs because the membrane is prevented from over-flexing and a greater proportion of the volume of medium within the cell can concentrate towards the upper portion of the cell towards an outlet port/check valve.

FIG. 4 represents the results of numerical modelling where four target parameters were considered: WEC device length, number of cells, cell/membrane membrane pressure-volume stiffness (measured in the range from 25% to 75% of cell volume) and valve area.

As can be seen in FIG. 4, particularly when considered in relation to the examples represented in FIGS. 1 to 3 and described above, the membrane pressure-volume stiffness (the rate of change in the membrane/cell pressure differential with respect to cell volume) significantly affects/influences WEC performance.

As described above and represented in FIGS. 1 to 3, membrane angle and chord length ratio have a direct influence on the membrane pressure-volume stiffness. Optimum membrane pressure-volume stiffness is close to zero stiffness for a substantial part of the volume change.

Non-zero stiffness for a substantial part of the volume change can be tolerated to some amount, preferably not exceeding +/-200 Pa/m$^3$ for acceptable, if not ideal, performance.

However, it will be appreciated that departing from zero stiffness for a substantial part of the volume change directly reduces the mean annual capture factor when the dynamic response of the membrane is over-damped so that resonance is not possible. Under these conditions, increases in membrane pressure-volume stiffness can only decrease the cell volume change in response to wave pressure.

The WEC can operate across a spectrum of wave heights, preferably with waves of 0.5 m and above. Throughout a year wave height can vary with seasons and prevailing sea state and weather conditions. The responsiveness of the membrane(s)/cell(s) of embodiments of the present invention enables full year energy production.

The relatively low membrane pressure-volume stiffness (relatively flat membrane pressure differential slope during a substantial part of volume change) and low inertia of the system enables responsiveness to low energy waves/low wave heights.

As shown in FIG. 5A, the cells of two linear arrays are arranged back to back with each back to back cell pair directly aligned with each other. Angling the entire WEC structure (both arrays) with respect to the oncoming incident waves allows both arrays of WEC cells to operate but with a timing difference from cell to cell as each wave passes over the WEC progressively acting on alternate front (wave facing) and rear (wave non-facing) cells, which can help smooth out response of the WEC to the wave pressure.

Arrow labelled $W_i$ represents the wave incident to the WEC arrays.

FIG. 5C shows a WEC configuration with the cells back to back in two linear arrays but each linear array is offset with respect to the other. Cell pressure response along the WEC alternates between the wave facing and wave non-facing cells to create opportunity to optimise/modify pressure response along the WEC as desired base don the angle of the incident waves.

Likewise, the back to back cells shown in plan view in FIG. 6A are in respective linear arrays and aligned back to back, whereas the arrangement shown in the WEC (plan view) in FIG. 6B are offset relative to each other across the WEC.

FIGS. 7 to 12 show alternative arrangements for varying the shape and/or position of a control surface and/or varying the chord ratio of the membrane.

In particular, FIGS. 7 to 12 show a side sectional view of various alternative embodiments of a WEC 100 having a cell 102 with a body 104 and a cell membrane 106.

Each cell includes a control surface 108. The shape and/or position of the control surface is controlled, such as by an adjustment means, to vary the volume and/or pressure of the cell, and/or to vary the membrane extending between upper and lower points to control the membrane chord ratio.

Figure 7:
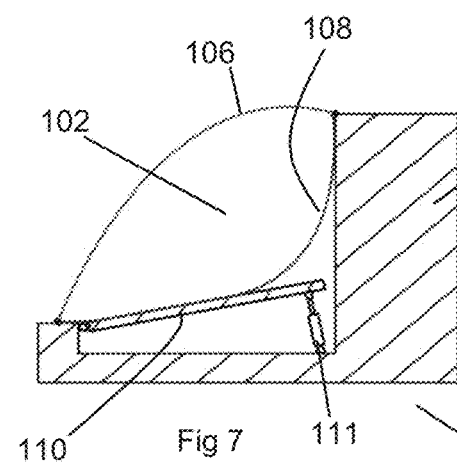
Figure 8:
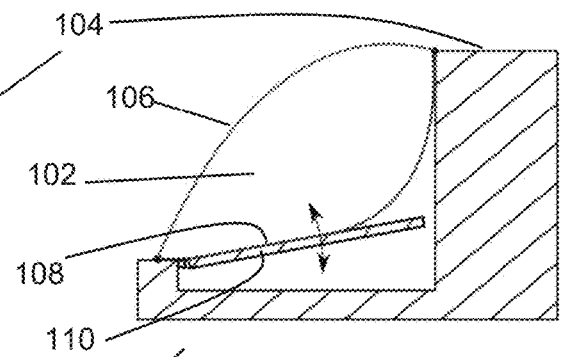

As shown in FIG. 7, a ramp 110 is driven by an actuator 111 to vary the inclination of the ramp. The ramp acts on the control surface 108, thereby varying the slope, shape and or position of the control surface, as shown in FIG. 8.

It will be appreciated that the control surface may form all of or part of a rear wall or boundary of the cell.

Figure 9:
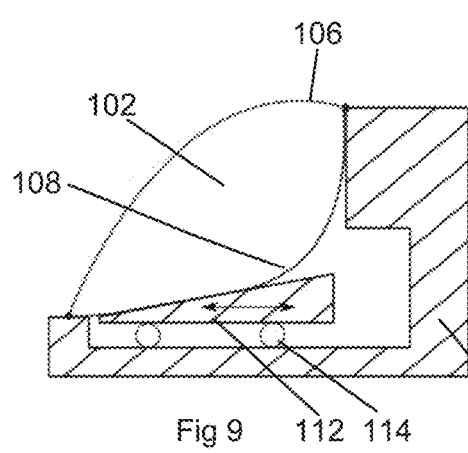

As shown in FIG. 9, the control surface 108 may be varied by a sliding ramp 112, which may be moved/driven on rollers or wheels, or driven by a screw or hydraulic actuator.

Figure 10:
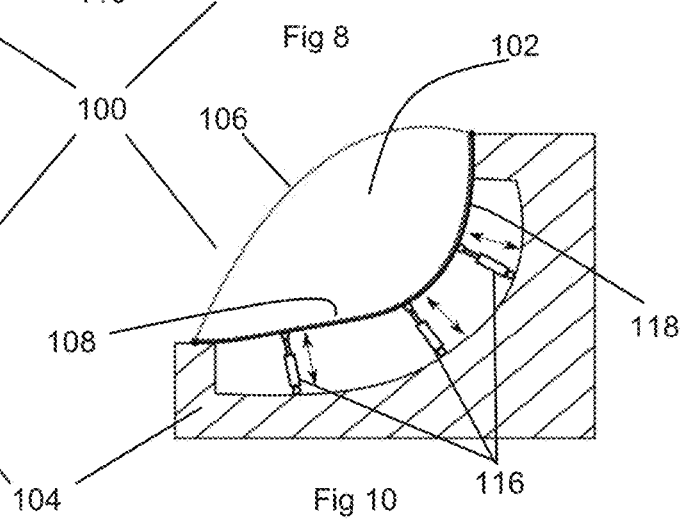

FIG. 10 shows an alternative embodiment, with the control surface acted on by at least one flexible member 118, such as one or more flexible panels, which can be driven by one or more member actuators 116.

Figure 11:
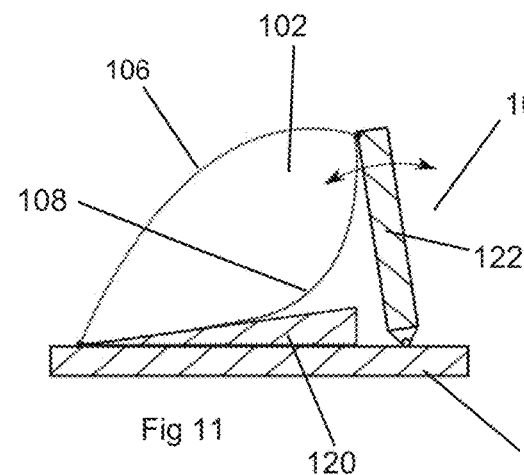

FIG. 11 shows an embodiment wherein the chord length/ration of the membrane as well as the control surface shape and/or position can be varied. An adjustment means 122 is connected to move the upper portion of the membrane as well as the upper portion of the control surface. A fixed ramp 120 provides inclined support to the control surface. Movement of the adjustment means may be pneumatically, hydraulically or mechanically driven.

Figure 12:
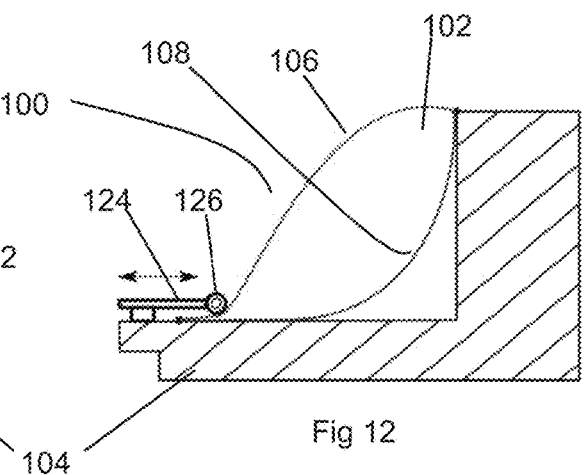

FIG. 12 shows an embodiment whereby the lower region of the membrane is acted on by a roller mechanism 126 driven by an adjustment mechanism 124 to vary the chord ratio.

The invention claimed is:

1. A wave energy convertor (WEC) configured for use while submerged, the WEC comprising at least one cell having a variable volume for containing an energy transfer fluid, wherein the variable volume is at least partly bounded by a movable flexible membrane, wherein the at least one cell is configured to provide a membrane pressure-volume stiffness of the respective flexible membrane close to zero during at least part of a respective cell volume deflation or inflation as a wave passes over the WEC.

2. The WEC of claim 1, wherein the at least one cell has a substantially constant membrane pressure differential for a substantial portion of a respective cell volume deflation or inflation.

3. The WEC of claim 2, further comprising at least one said cell having a range in said membrane pressure differential during a substantial part of the inflation or deflation that is substantially less than the range in wave pressure.

4. The WEC of claim 1, wherein the chord ratio of the flexible membrane of at least one cell is between 1.01 and 1.3 during operation, wherein the chord ratio is the ratio of the length of the flexible membrane relative to straight-line distance between opposed points of the flexible membrane, and wherein the opposed points are on a shared vertical plane.

5. The WEC of claim 1, wherein the chord between opposed attachment points of the flexible membrane is at an angle between 20° and 60° from horizontal, and wherein the opposed points are on a shared vertical plane.

6. The WEC of claim 1, further comprising porting, valving, one or more energy transfer fluid flow chokes or restrictors, or a combination of any two or more thereof, to enable increase or decrease in cell pressure during a respective deflation or inflation stroke.

7. The WEC of claim 1, further comprising at least one control surface configured to vary one or more of the cell volume, cell pressure, membrane pressure-volume stiffness, or providing a travel limit for the membrane during cell deflation or inflation, or including at least one said control surface configured to vary one or more of the cell volume, cell pressure, membrane pressure-volume stiffness, and providing a travel limit for the membrane during cell deflation or inflation.

8. The WEC of claim 7, wherein the at least one control surface has a straight or curved control surface, or a combination thereof.

9. The WEC of claim 7, wherein the at least one control surface has at least a portion inclined at an angle from horizontal, from or adjacent a lower end of the membrane.

10. The WEC of claim 7, wherein the at least one control surface has a curved portion.

11. The WEC of claim 10, wherein the curved portion has a concave portion with respect to the membrane that moves toward or away from the respective control surface.

12. The WEC of claim 10, wherein the curved portion is provided toward an upper portion of the respective cell or toward an upper fixed end or an upper point of the flexible membrane.

13. The WEC of claim 7, wherein the at least one control surface provides a structural portion of the respective cell.

14. The WEC of claim 7, wherein the at least one control surface provides an insert within a respective cell.

15. The WEC of claim 7, wherein the at least one control surface has a solid continuous surface or an open framework, mesh or grid.

16. A wave energy convertor (WEC) control method for use in controlling the WEC according to claim 7, the method comprising:
controlling the shape or position, or controlling the shape and the position, of the at least one control surface to control membrane pressure differential and maintain low pressure-volume stiffness of the or each cell during a part of the inflation or deflation that is less than the range in the incident wave pressure over time at the depth of the flexible membrane.

17. The method of claim 16, further comprising controlling the shape or the position, or the shape and the position, of the at least one control surface of the respective cell to vary the cell volume, the membrane pressure differential or maximum deflation, or the membrane pressure differential and the maximum deflation, during at least a portion of the membrane inflation or deflation.

18. The method of claim 17, wherein the at least one control surface provides a wall portion or a floor portion, or the wall and the floor portion, of the respective cell, and control of the at least one control surface includes controlling position or shape, or controlling the position and the shape, of the wall portion or the floor portion.

19. The method of claim 17, wherein the at least one control surface is provided externally.

20. The method of claim 16, wherein the at least one control surface is used to control a length or chord ratio of the membrane to control the membrane pressure differential.

21. The method of claim 16, further comprising controlling a movement of the flexible membrane by contact with the at least one control surface.

22. The method of claim 16, wherein contact between the flexible membrane and the at least one control surface provides a braking or damping effect and/or travel stop to membrane travel.

23. The method of claim 16, further comprising the at least one control surface acting to support a lower portion of the flexible membrane.

24. The method of claim 16, wherein the at least one control surface has a controllable ramp within the cell or each respective cell, the ramp being varied in shape or position, or shape and position to control volume bi-stability of the respective cell.

25. The method of claim 24, further comprising controlling the ramps provided in two or more of the cells and used to control cell volume to equalize a membrane pressure differential between the two or more cells.

26. The method of claim 16, including maintaining a wave center of pressure on the flexible membrane of at least one cell substantially at a constant vertical position or height, or rising, during a discharge stroke of the flexible membrane or at a constant vertical position or height, or falling during a charge stroke of the flexible membrane.

27. A wave energy convertor (WEC) control method for a submerged WEC, wherein the WEC has at least one cell having a variable volume at least partly bounded by a flexible membrane, the variable volume containing a fluid for effecting energy transfer from a wave, wherein the method comprises:
controlling pressure or displacement of the fluid, or controlling the pressure and the displacement of the fluid, such that at least part of the displacement of the fluid occurs while maintaining a membrane pressure-volume stiffness of the respective flexible membrane close to zero for a substantial change in cell volume, as the wave passes over the WEC.

28. The method of claim 27, wherein a substantial part of the displacement of the fluid occurs over a substantially constant pressure difference between wave pressure and fluid pressure.

29. The method of claim 27, wherein a part of discharge of the fluid is controlled to occur towards or at the highest wave pressure incident on the WEC or a part of intake of the fluid is controlled to occur towards or at the lowest wave pressure incident on the WEC, or the part of the discharge of the fluid is controlled to occur towards or at the highest wave pressure incident on the WEC and the part of intake of the fluid is controlled to occur towards or at the lowest wave pressure incident on the WEC.

30. The method of claim 27, wherein a center of pressure of the membrane is controlled to move level or rising with respect to horizontal during at least part of a respective cell volume deflation or level or falling with respect to horizontal during at least part of a respective cell volume inflation, or the center of pressure of the membrane is controlled to move level or rising with respect to horizontal during at least part of the respective cell volume deflation and substantially level or falling with respect to horizontal during at least part of the respective cell volume inflation, by varying the shape and/or position of at least one control surface.

* * * * *